UNITED STATES PATENT OFFICE.

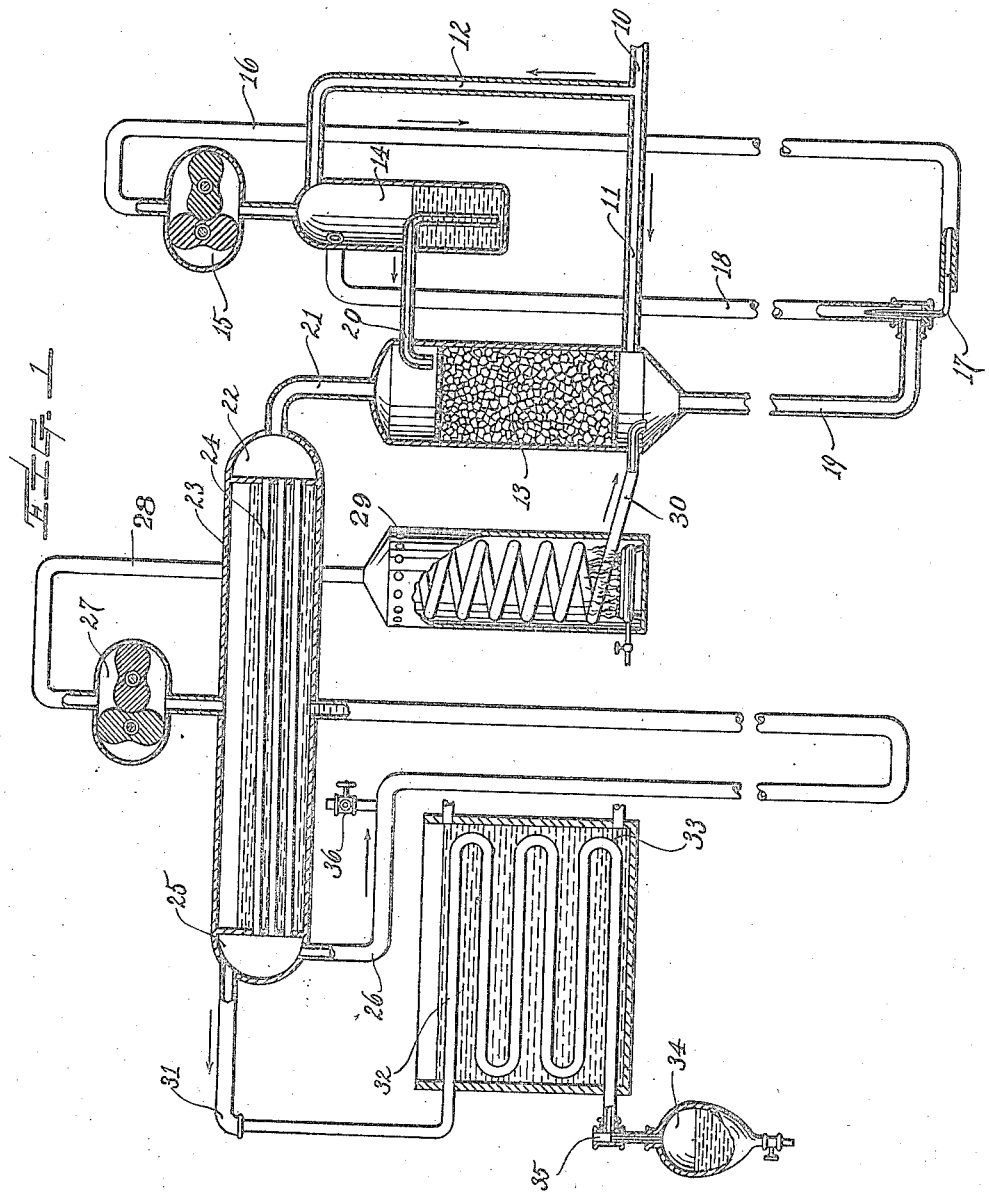

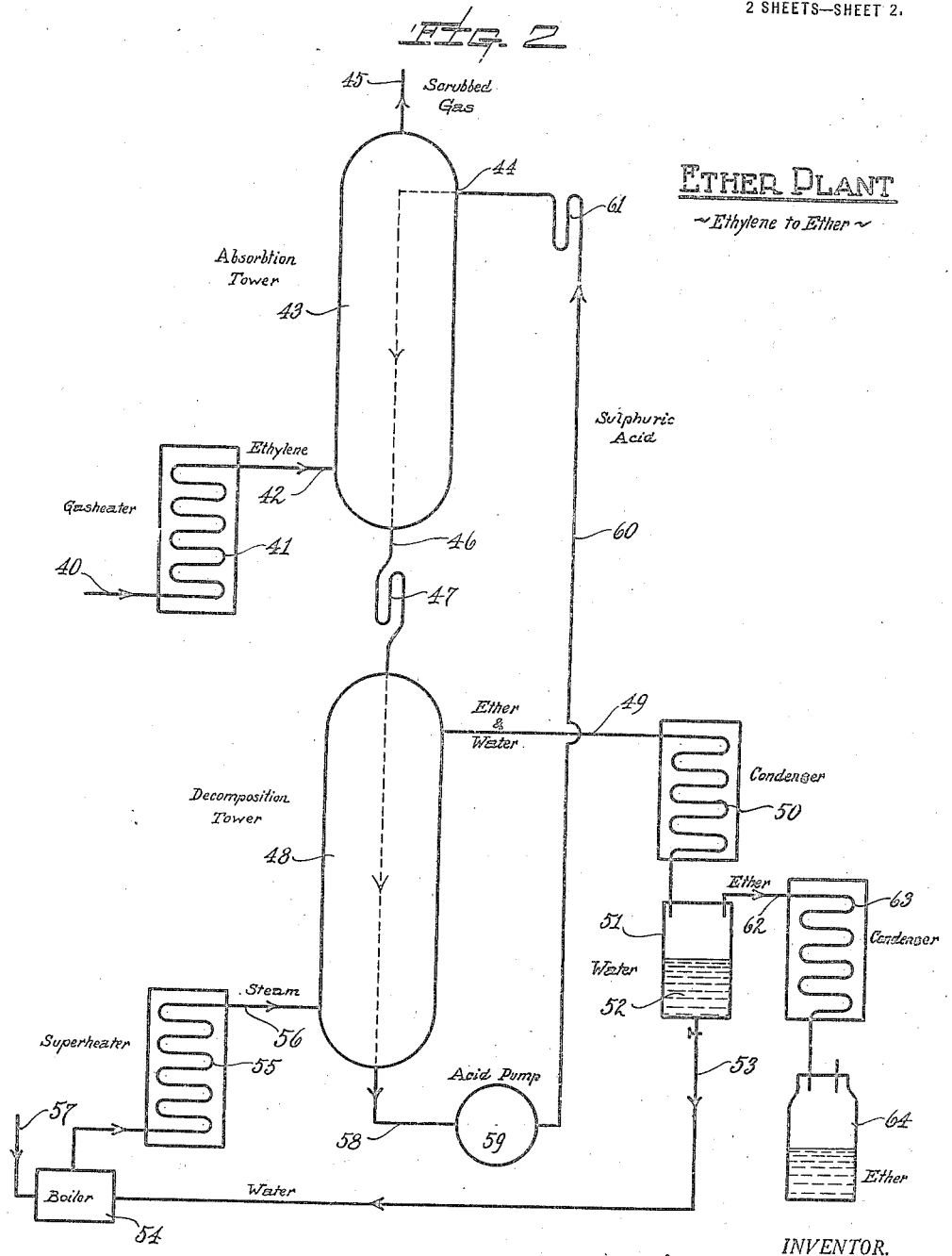

CHARLES S. BRADLEY, OF NEW YORK, N. Y., ASSIGNOR TO AMERICAN CELLULOSE & CHEMICAL MANUFACTURING COMPANY, LIMITED, OF NEW YORK, N. Y.

PRODUCTION OF ETHER.

1,385,040.

Specification of Letters Patent.

Patented July 19, 1921.

Application filed November 20, 1919. Serial No. 339,336.

*To all whom it may concern:*

Be it known that I, CHARLES S. BRADLEY, a citizen of the United States, and a resident of the borough of Manhattan, city, county, and State of New York, have invented certain new and useful Improvements in the Production of Ether, of which the following is a specification.

This invention relates to the production of ether and has for an important object the commercial production of this substance at low cost.

According to the process which forms the subject matter of this invention, ether is produced continuously from ethylene with the aid of sulfuric acid, which apparently performs the function of a catalytic agent in the supply of water to the ethylene. In the operation of the process, the sulfuric acid is automatically maintained in substantially constant quantity and strength, so that the operation may be carried on continuously by the continued introduction of ethylene and water from an outside source. As water is carried over with the ether, and some unconverted ethylene may pass off with the waste gases, the process may advantageously be conducted in a cyclic manner returning the water and unconverted ethylene to the action of the sulfuric acid. It is of course necessary that the reaction and distillation temperature be suitably maintained and that cooling be employed for condensing the ether. These operations will be clearly set forth in a detailed description of two embodiments of the invention.

The invention is illustrated diagrammatically in the accompanying drawing, in which, Figures 1 and 2 represent two examples of apparatus suitable for conducting the operations involved.

Referring to the apparatus shown in Fig. 1, the ethylene is received through the supply pipe 10, which is divided into two branch pipes 11 and 12, leading respectively to the bottom of an absorption tower 13 and to the top of an acid trap 14. A pump 15 withdraws the gas from the top of trap 14 and forces it downward through pipe 16 from which it is delivered upwardly through the delivery tip 17 into the acid lifting pipe 18. Pipe 18 receives the acid returning through pipe 19 from the bottom of the absorption tower 13, so that the mixture of acid and gas rises through the pipe 18 and is discharged into the trap 14. The acid and gas here separate, the gas being circulated continuously and in cyclic manner. The acid overflows continuously through the acid delivery pipe 20 into the upper portion of the absorption tower 13. A continuous circulation of acid is thus maintained in cyclic manner from trap 14, through delivery pipe 20, absorption tower 13, return pipe 19 and acid lifting pipe 18 back to trap 14. During the contact and commingling of the ethylene with the sulfuric acid in this circulating operation there will be more or less absorption and even chemical reaction taking place, but the production of ether occurs primarily in the absorption tower 13, and the ethylene passing through the branch pipe 11 is delivered directly to the bottom of the absorption tower.

Rising through the absorption tower 13, the ethylene is brought into contact with the greatly extended surface of the acid, so that the opportunity for absorption is fully presented. The temperature in the tower 13, is moreover, maintained steadily at the point favoring the production of ether, that is to say, around 140° C. to 145° C. At these temperatures I find no indication of acid being carried over with the vapor, but the vapor contains, in addition to the ether, considerable water and such gas as may have passed through the tower without being absorbed or acted upon. Most of the water is condensed and separated from the ether before subjecting the mixture to condensation of the ether, and this separated water is superheated and returned to the absorption apparatus continuously and in cyclic manner to maintain the reaction temperature. These operations can be carried out in various ways. According to Fig. 1, the vapors comprising mainly ether and water vapor are led off through pipe 21 into the header 22 of a condenser-boiler 23. From the header 22 the vapors pass through the condenser tubes 24 wherein most of the water is condensed. The condensed water flows into header 25 and into the return pipe 26 by which it is led into the boiler space surrounding the condenser tubes 24 under the reduced pressure maintained by the exhaust pump 27. This reduced pressure is below the vapor pressure of the liquid at the temperature to which the liquid is heated by the condensation occurring within tubes 24, so that evaporation occurs. The water vapor thus produced is delivered by pump 27 through pipe 28 into a superheater 29, and the superheated steam is delivered through pipe 30 into the lower portion of the absorption tower 13.

The mixture of ether and uncondensed water vapor delivered into the header 25 passes over through pipe 31 which leads through a condensation coil 32 submerged in a body of cooling water 33 so that final condensation of the ether with some water is accomplished. The liquid flows into any suitable receiver such as 34. The separation of ether from the water with which it is condensed may be accomplished in any well known manner and need not be referred to specifically herein.

The condenser-boiler 23 operates under a pressure difference by which the same temperature results in condensation at a higher pressure and evaporation at a lower pressure. The space within header 25 and tubes 24 is approximately at atmospheric pressure, the coil 32 of condenser 33 being open to atmosphere at 35. Water condensing at atmospheric pressure drains into pipe 26 which preferably extends downward some distance to form a column of considerable height whereas the body of liquid within the space surrounding tubes 24 is normally maintained at a higher level than the liquid in the left hand leg of the pipe 26. The latent heat of the condenser liquid is delivered through the walls of tubes 24 into the liquid surrounding these tubes so that the change of state is theoretically accomplished by the thermo-dynamic power of the exhaust pump 27.

The chemical reaction upon ethylene, sulfuric acid and water is not entirely clear but may be explained for all practicable purposes on the theory of catalytic action. It is apparent that two molecules of ethylene when combined with one molecule of water, represent the constitution of ethyl ether. In the presence of sulfuric acid and at the operating temperature of about 140°–145° C., ethyl ether is distilled over from the absorption tower 13 together with water vapor and possibly some alcohol and unabsorbed gases present in the original ethylene supply. In numerous tests which have been made the presence of sulfuric acid in the distillate has not been detected and a quantity of sulfuric acid in the system appears to remain constant. On the other hand, water is of course carried over with the vapors and is also used up in the constitution of the ether molecule. For these reasons it is necessary to restore water to the system from the outside source. This may be accomplished for example at the point 36.

In Fig. 2 the system is somewhat modified in detail but follows the generic principle involved in Fig. 1. Ethylene is supplied at point 40 through the gas heater coil 41 and pipe 42 into the lower portion of an absorption tower 43 of any approved type in which sulfuric acid delivered through pipe 44 passes down over a greatly extended surface of suitable filling material. The heater 41 delivers the ethylene at such a temperature as to maintain the absorbing temperature at the proper point within the tower 43. This may be somewhat below 145° C., but high enough to insure absorption of the ethylene by the sulfuric acid. The scrubbed gases may be discharged through outlet 45. The liquid containing the absorbed ethylene passes from the bottom of tower 43 through pipe 46, which is provided with trap 47 and into the top of a second tower 48, generally similar to tower 43 maintained at a temperature of from 140°–145° C., as will be explained. This temperature sets free or causes the distillation of ether and water which substances pass off through pipe 49, through condenser 50 and into the separator 51. The separator 51 removes a large part of the water as indicated at 52 and this condensed water is returned through pipe 53, boiler 54 and superheater 55 which thus delivers superheated steam through pipe 56 into the decomposition tower 48. The body of water returned through pipe 53 may be supplemented by water from an outside source introduced through inlet 57 for reasons above explained. The steam rising through the decomposition tower 48 raises the temperature therein and may be regarded as completing the chemical action by which ethyl ether is formed from ethylene and water by the catalytic action of sulfuric acid. The sulfuric acid remaining after this action is removed through pipe 58 and returned by acid pump 59, through pipe 60, trap 61 and pipe 44 to the absorption tower 43.

Referring again to the separator 51, the ether containing some water vapor passes through pipe 62 into the final condenser 63 by which the ether and water vapor are condensed so that a mixed liquid of ether and water are collected in the receiver 64. This mixture of ether and water may be further treated in a known manner for the purification of the ether.

As long as the liquid continues to boil, its temperature will be an indication of the strength of the acid. The temperature is therefore kept at the point which is most favorable to the production of ether, for example around 140° C. The temperature of the steam is regulated, accordingly, to maintain the desired temperature in the liquid, the strength of the acid being thereby maintained constant. It will be apparent, from this consideration, that the supply of heat to the system in the superheated steam is an important feature of the new method. Any excess of steam or water immediately boils off and leaves the acid of constant strength, provided the steam is introduced at a temperature above the boiling point of the liquid.

I claim:

The method of producing ether which comprises absorbing ethylene in sulfuric acid at about 140° C. and introducing into the mixture superheated steam at a temperature higher than the boiling point of the acid to keep the strength of the acid substantially constant.

CHARLES S. BRADLEY.